United States Patent
Kuznetsov et al.

(10) Patent No.: US 10,354,404 B2
(45) Date of Patent: Jul. 16, 2019

(54) ELECTRONIC DEVICE AND CONTROL METHOD THEREFOR

(71) Applicant: LG ELECTRONICS INC., Seoul (KR)

(72) Inventors: Pavel Kuznetsov, Seoul (KR); Kyungdong Choi, Seoul (KR); Dmitry Gavrilenko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 170 days.

(21) Appl. No.: 15/504,295

(22) PCT Filed: Apr. 1, 2015

(86) PCT No.: PCT/KR2015/003240
§ 371 (c)(1),
(2) Date: Feb. 15, 2017

(87) PCT Pub. No.: WO2016/080605
PCT Pub. Date: May 26, 2016

(65) Prior Publication Data
US 2017/0263014 A1    Sep. 14, 2017

(30) Foreign Application Priority Data
Nov. 18, 2014 (KR) .................. 10-2014-0161208

(51) Int. Cl.
*G06T 7/70* (2017.01)
*G01C 21/34* (2006.01)
(Continued)

(52) U.S. Cl.
CPC .............. *G06T 7/70* (2017.01); *B60K 35/00* (2013.01); *B60R 1/00* (2013.01); *G01C 21/34* (2013.01);
(Continued)

(58) Field of Classification Search
CPC ......... G06T 7/70; G06T 19/006; H04N 7/188; H04N 7/183; B60K 35/00;
(Continued)

(56) References Cited

U.S. PATENT DOCUMENTS 8,761,991 B1 *  6/2014  Ferguson ............. G05D 1/0088
340/917
2002/0047895 A1 *  4/2002  Bernardo ............... G01C 11/02
348/48

(Continued)

FOREIGN PATENT DOCUMENTS

KR         101280170         2/2013
KR      10-2013-0057699      6/2013
(Continued)

OTHER PUBLICATIONS

PCT International Application No. PCT/KR2015/003240, Written Opinion of the International Searching Authority dated Aug. 26, 2015, 4 pages.

*Primary Examiner* — Joseph Suh
(74) *Attorney, Agent, or Firm* — Lee Hong Degerman Kang & Waimey

(57) ABSTRACT

A method for controlling an electronic device includes receiving first location information of a vehicle through a location information module, capturing an image through a camera while the vehicle is driven, extracting characteristic points from the captured image and converting the captured image into a 3-D image, obtaining second location information by correcting the first location information based on a moving displacement and orientation direction of the camera installed on the vehicle, extracting an aerial view from the 3-D image based on the moving displacement and orientation direction of the camera, estimating a moving path of the vehicle using locations of traffic lanes included in the aerial view and the second location information, and (Continued)

displaying the captured image and the moving path of the vehicle in augmented reality by combining the captured image and the moving path.

11 Claims, 8 Drawing Sheets

(51) Int. Cl.
*G01S 19/38* (2010.01)
*H04B 1/40* (2015.01)
*B60K 35/00* (2006.01)
*B60R 1/00* (2006.01)
*G06K 9/46* (2006.01)
*G06T 19/00* (2011.01)
*H04N 7/18* (2006.01)
*G01C 21/36* (2006.01)
*G05D 1/02* (2006.01)
*G01S 19/40* (2010.01)

(52) U.S. Cl.
CPC ..... *G01C 21/3635* (2013.01); *G01C 21/3667* (2013.01); *G01S 19/38* (2013.01); *G01S 19/40* (2013.01); *G05D 1/0251* (2013.01); *G06K 9/4604* (2013.01); *G06T 19/006* (2013.01); *H04B 1/40* (2013.01); *H04N 7/183* (2013.01); *H04N 7/188* (2013.01); *B60K 2350/106* (2013.01); *B60K 2350/2013* (2013.01); *B60K 2350/2017* (2013.01); *B60K 2350/2052* (2013.01); *B60K 2350/965* (2013.01); *B60R 2300/205* (2013.01); *B60R 2300/30* (2013.01); *B60R 2300/607* (2013.01); *B60R 2300/804* (2013.01); *G05D 2201/0213* (2013.01)

(58) Field of Classification Search
CPC ........ B60K 2350/106; B60K 2350/965; B60K 2350/2013; B60K 2350/2052; B60K 2350/2017; G06K 9/4604; B60R 1/00; B60R 2300/205; B60R 2300/30; B60R 2300/607; B60R 2300/804; G01C 21/34; H04B 1/40; G01S 19/38
See application file for complete search history.

(56) References Cited

U.S. PATENT DOCUMENTS

| | | | |
|---|---|---|---|
| 2011/0001798 A1* | 1/2011 | Cookson | G03B 35/00 348/47 |
| 2013/0070095 A1* | 3/2013 | Yankun | G06K 9/00805 348/148 |
| 2013/0177211 A1* | 7/2013 | Watanabe | G06K 9/00798 382/103 |
| 2014/0218354 A1* | 8/2014 | Park | G06T 3/4038 345/419 |
| 2014/0368651 A1* | 12/2014 | Irschara | G06T 7/00 348/148 |
| 2015/0309316 A1* | 10/2015 | Osterhout | G06F 3/012 345/8 |
| 2016/0088287 A1* | 3/2016 | Sadi | H04N 13/254 348/43 |

FOREIGN PATENT DOCUMENTS

| | | |
|---|---|---|
| KR | 101271235 | 6/2013 |
| KR | 10-2013-0110907 | 10/2013 |
| KR | 10-2013-0137074 | 12/2013 |

* cited by examiner

[Figure 1a]
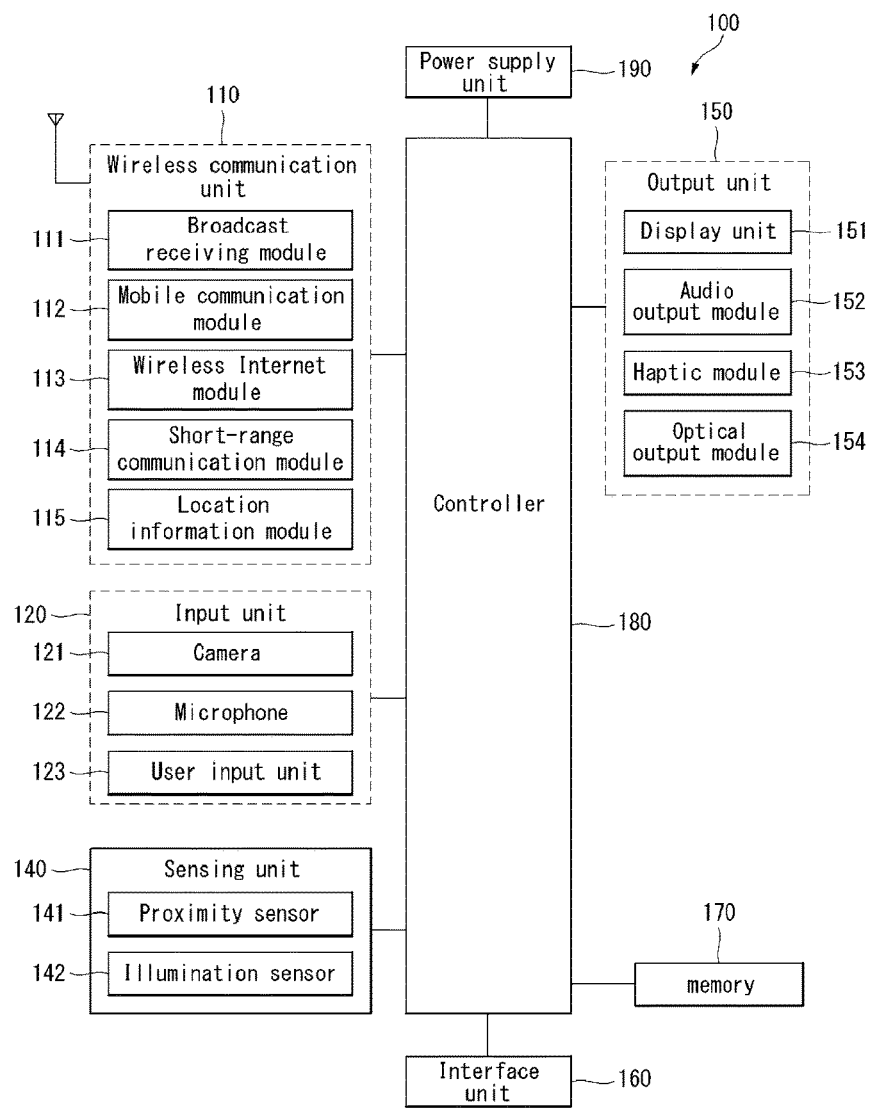

【Figure 1b】
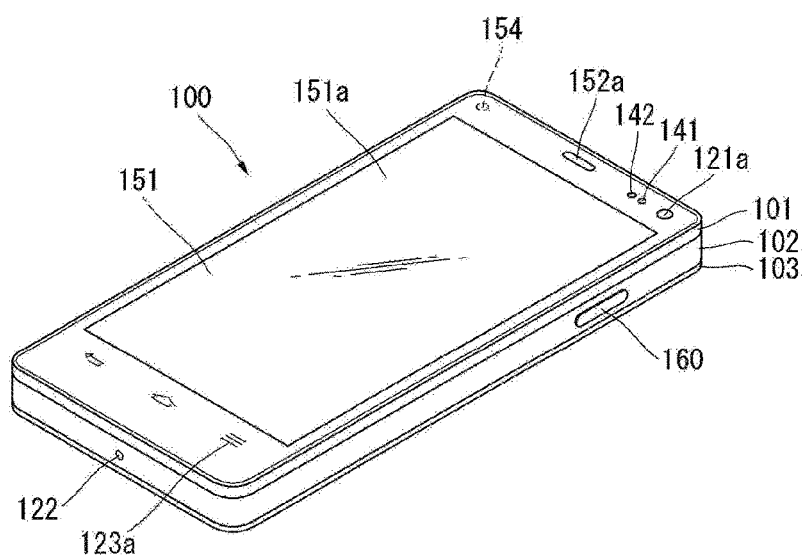
【Figure 1c】
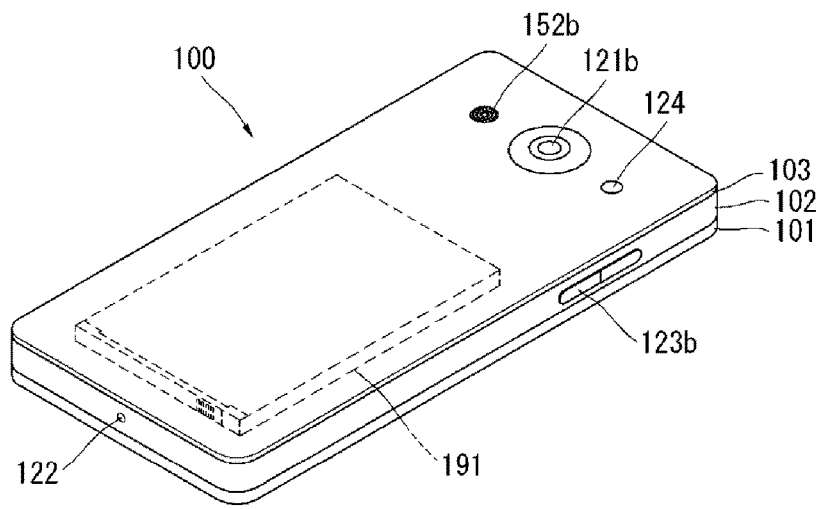

【Figure 2】
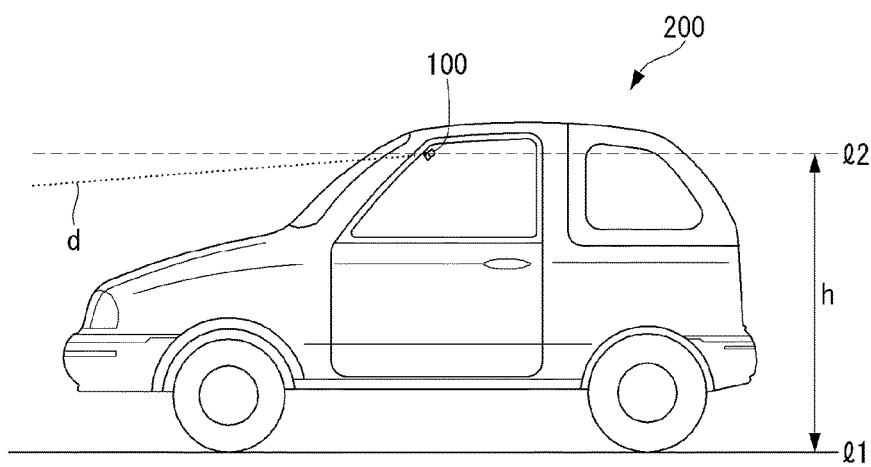
【Figure 3】
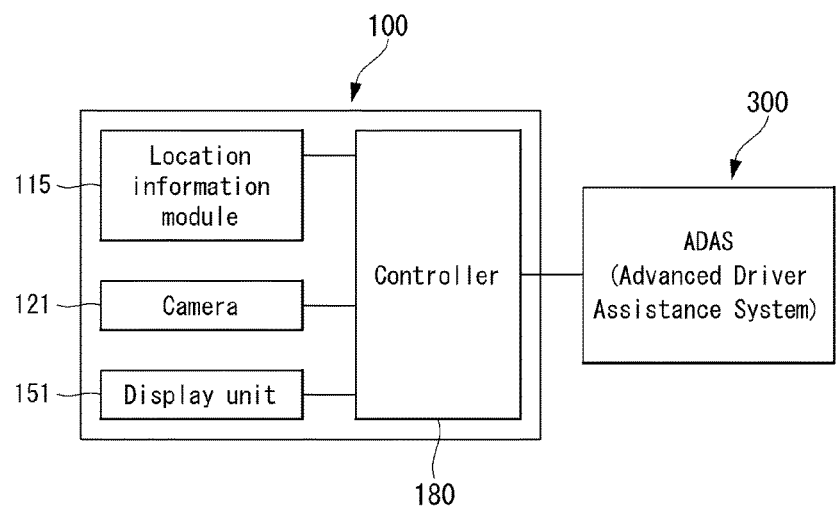

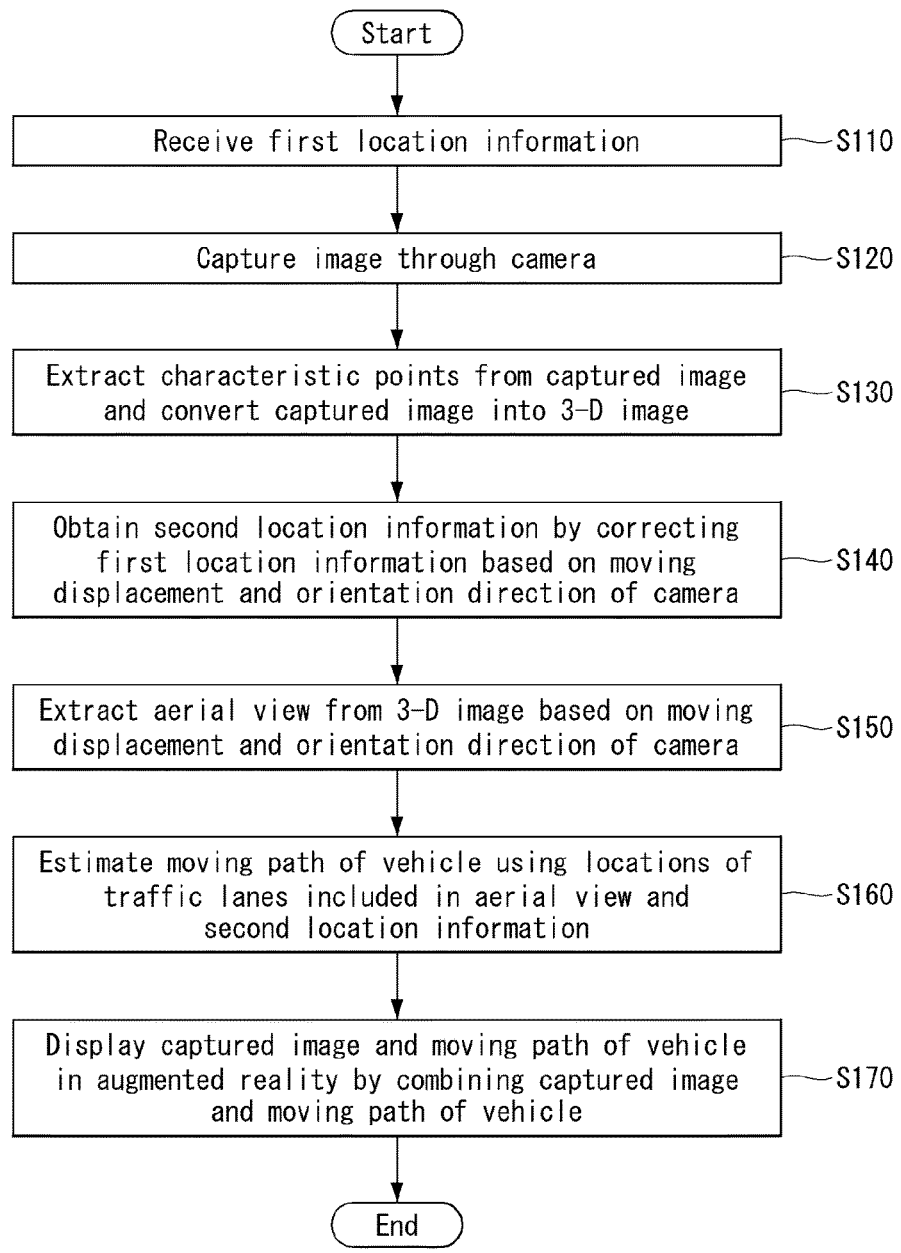
[Figure 4]

[Figure 5]
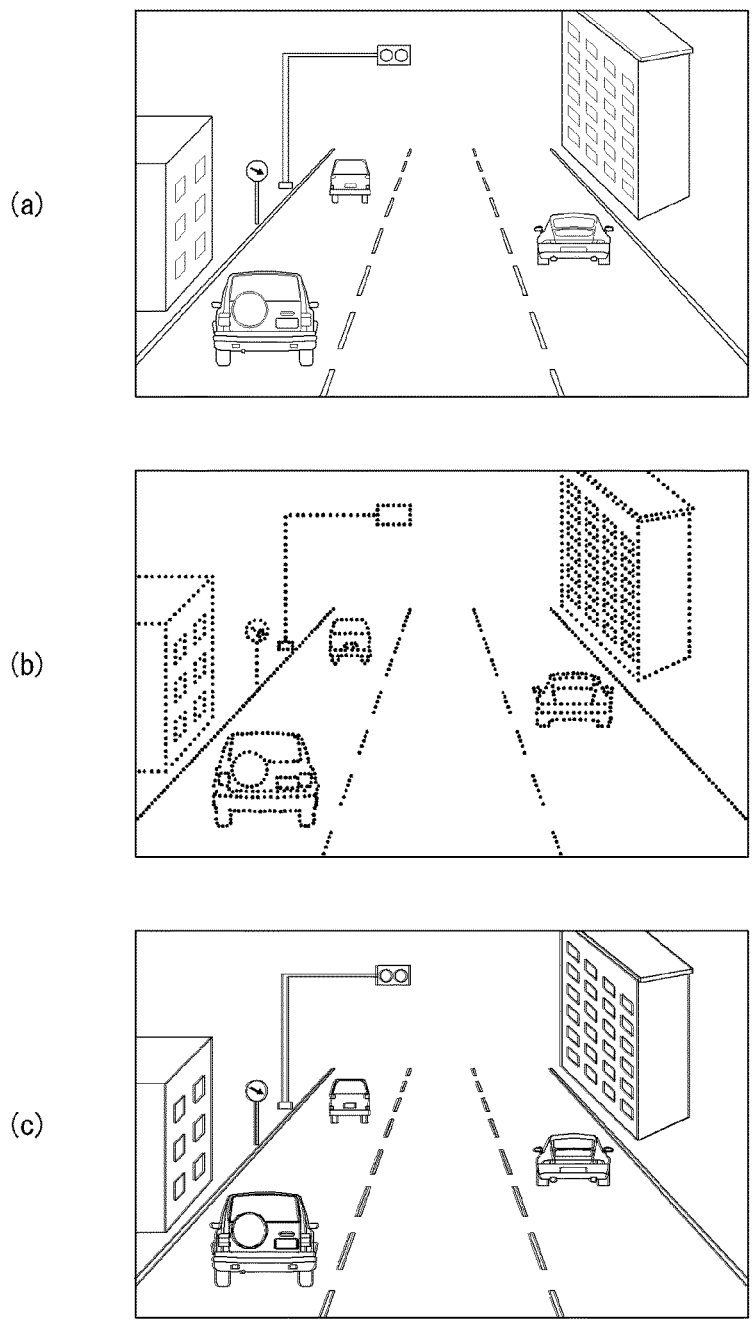

【Figure 6】
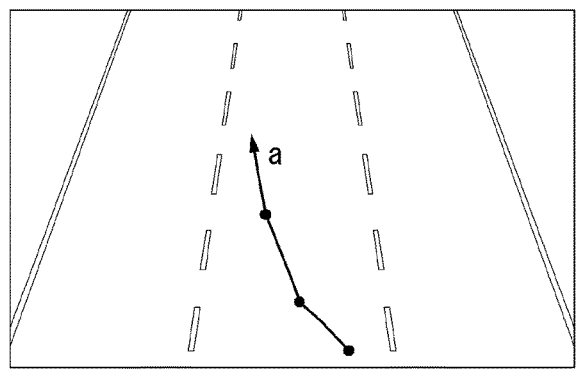
【Figure 7】
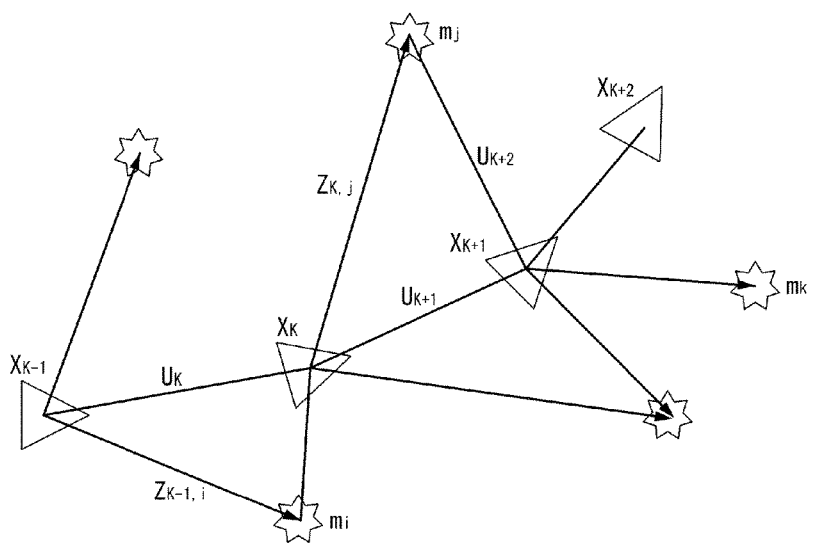

【Figure 8】
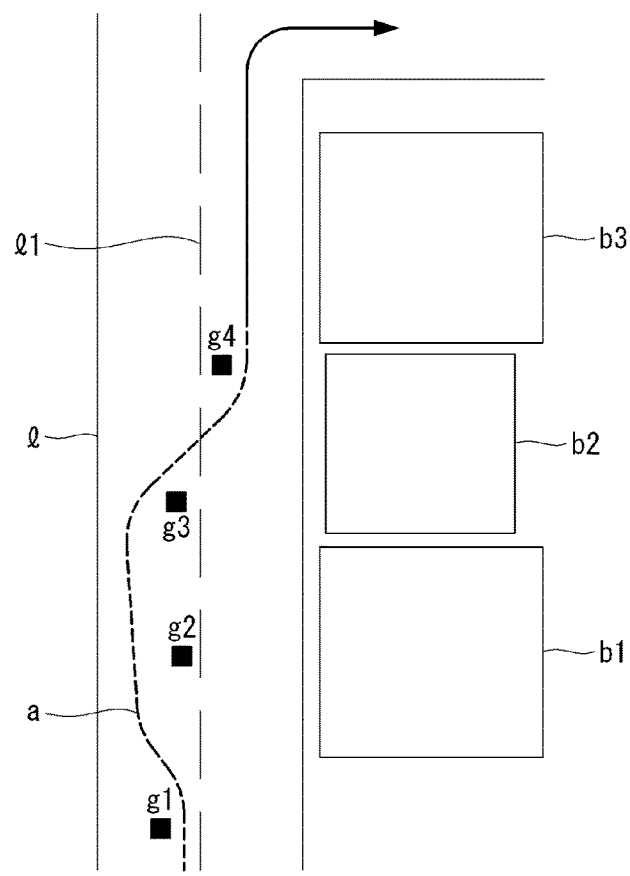

【Figure 9】
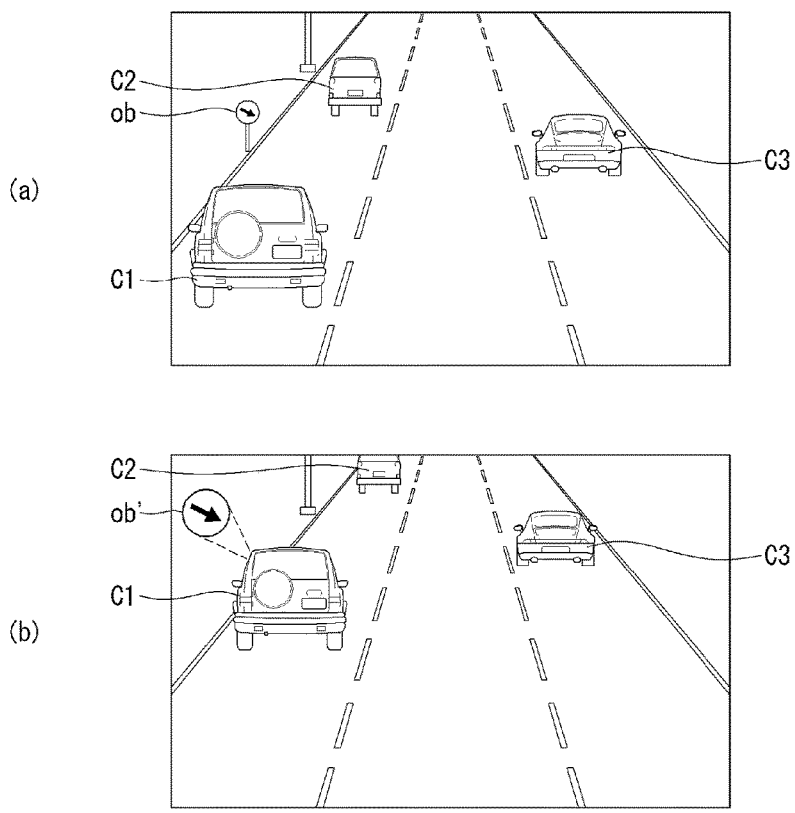

ELECTRONIC DEVICE AND CONTROL METHOD THEREFOR

CROSS-REFERENCE TO RELATED APPLICATIONS

This application is the National Stage filing under 35 U.S.C. 371 of International Application No. PCT/KR2015/003240, filed on Apr. 1, 2015, which claims the benefit of earlier filing date and right of priority to Korean Application No. 10-2014-0161208, filed on Nov. 18, 2014, the contents of which are all incorporated by reference herein in their entirety.

TECHNICAL FIELD

The present invention relates to an electronic device for estimating the moving path of a vehicle using an image captured by a camera and GPS information and a method for controlling the same.

BACKGROUND ART

Terminals may be generally classified as mobile/portable terminals or stationary terminals according to their mobility. Electronic device may also be classified as handheld terminals or vehicle mounted terminals according to whether or not a user may directly carry the terminal.

Electronic devices have become increasingly more functional. Examples of such functions include data and voice communications, capturing images and video via a camera, recording audio, playing music files via a speaker system, and displaying images and video on a display.

Some electronic devices include additional functionality which supports game playing, while other terminals are configured as multimedia players. More recently, electronic devices have been configured to receive broadcast and multicast signals which permit viewing of content such as videos and television programs.

Efforts are ongoing to support and increase the functionality of electronic devices. Such efforts include software and hardware improvements as well as changes and improvements in the structural elements.

A terminal is attached to the inside of a vehicle and may provide various services for the vehicle, such as a navigator function. If the terminal is attached to the vehicle and used as described above, it is necessary to accurately obtain the moving path of the vehicle when the vehicle moves.

DISCLOSURE

Technical Problem

The present invention has been made to solve the aforementioned and other problems. Embodiments of the present invention are directed to the provision of an electronic device for extracting the characteristic points of an image captured by a camera, converting the captured image into a three-dimensional (3-D) image, obtaining second location information by correcting first location information received through a location information module based on a moving displacement and orientation direction of the camera, extracting an aerial view from the 3-D image, estimating a moving path of a vehicle using the locations of traffic lanes included in the aerial view and the obtained second location information, and displaying the captured image and the moving path of the vehicle in augmented reality by combining the captured image and the moving path of the vehicle and a method for controlling the same.

Technical Solution

In accordance with an aspect of the present invention, there is provided an electronic device, including a location information module, a camera, and a controller configured to extract the characteristic points of an image captured by the camera, convert the captured image into a 3-D image, obtain second location information by correcting first location information received through the location information module based on the moving displacement and orientation direction of the camera, extract an aerial view from the 3-D image, estimate the moving path of a vehicle using the locations of traffic lanes included in the aerial view and the obtained second location information, and represent the captured image and the moving path of the vehicle in augmented reality by combining the captured image and the moving path of the vehicle.

Furthermore, in accordance with another aspect of the present invention, there is provided a method for controlling an electronic device, including receiving first location information of a vehicle through a location information module, capturing an image through a camera while the vehicle is driven, extracting characteristic points from the captured image and converting the captured image into a 3-D image, obtaining second location information by correcting the first location information based on a moving displacement and orientation direction of the camera installed on the vehicle, extracting an aerial view from the 3-D image based on the moving displacement and orientation direction of the camera, estimating a moving path of the vehicle using locations of traffic lanes included in the aerial view and the second location information, and displaying the captured image and the moving path of the vehicle in augmented reality by combining the captured image and the moving path.

Advantageous Effects

Effects of the electronic device and the method for controlling the same according to embodiments of the present invention are described below.

In accordance with at least one of the embodiments of the present invention, there is an advantage in that information about the accurate location of a vehicle can be estimated by correcting GPS information of the vehicle.

Furthermore, in accordance with at least one of the embodiments of the present invention, there is an advantage in that a vehicle can display a moving path and a milestone in virtual reality using an image obtained from a camera mounted on the vehicle.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DESCRIPTION OF DRAWINGS

FIG. 1A is a block diagram of an electronic device in accordance with the present disclosure.

FIGS. 1B and 1C are conceptual views of one example of the electronic device, which are viewed from different directions.

FIG. 2 is a diagram illustrating an embodiment in which the electronic device related to an embodiment of the present invention is attached to a vehicle.

FIG. 3 is a diagram illustrating a connection relation between the electronic device related to an embodiment of the present invention and an advanced driver assistance system (ADAS) of a vehicle when the electronic device is attached to the vehicle.

FIG. 4 is a flowchart illustrating an embodiment of a method for controlling the electronic device, which is related to an embodiment of the present invention.

FIG. 5 is a diagram illustrating a method for converting a two-dimensional (2-D) image, obtained by the electronic device, into a 3-D image, which is related to an embodiment of the present invention.

FIG. 6 is a diagram illustrating a method for obtaining an aerial view in the electronic device, which is related to an embodiment of the present invention.

FIGS. 7 and 8 are diagrams illustrating a method for estimating the moving path of a vehicle using an SLAM technology in the electronic device, which is related to an embodiment of the present invention.

FIG. 9 is a diagram illustrating a method for displaying the moving path of a vehicle in augmented reality in the electronic device, which is related to an embodiment of the present invention.

MODE FOR INVENTION

Description will now be given in detail according to exemplary embodiments disclosed herein, with reference to the accompanying drawings. For the sake of brief description given with reference to the drawings, the same or equivalent elements may be provided with the same reference numbers, and description thereof will not be repeated. In general, a suffix such as "module" and "unit" may be used to refer to elements or elements. Use of such a suffix herein is merely intended to facilitate description of the specification, and the suffix itself is not intended to give any special meaning or function. In the present disclosure, contents well known to a person having ordinary skill in the art has been omitted for the sake of brevity. The accompanying drawings are used to help easily understand various technical features, and it should be understood that the embodiments presented herein are not limited to the accompanying drawings. The present disclosure should be construed as being extended to any alterations, equivalents and substitutes in addition to those particularly set out in the accompanying drawings.

It will be understood that although the terms, such as the first and the second, are used herein to describe various elements, such elements should not be limited by the terms. Such terms are generally only used to distinguish one element from another.

It will be understood that when an element is referred to as being "connected with" another element, the element may be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several elements, functions or steps, disclosed in the specification, and it is also understood that greater or fewer elements, functions, or steps may likewise be used.

Electronic devices presented herein may be implemented using a variety of different types of terminals. Examples of such electronic devices include cellular phones, smart phones, user equipment, laptop computers, digital broadcast terminals, Personal Digital Assistants (PDAs), Portable Multimedia Players (PMPs), navigators, Portable Computers (PCs), slate PCs, tablet PCs, ultra books, wearable devices (e.g., smart watches, smart glasses, Head Mounted Displays (HMDs)) and so on.

By way of a non-limiting example only, further description will be given with reference to particular types of electronic devices. However, such teachings are equally applied to other types of terminals, such as those described above. In addition, the teachings may also be applied to stationary terminals, such as digital TV and desktop computers.

Reference is now made to FIGS. 1A to 1C, where FIG. 1A is a block diagram of an electronic device in accordance with the present disclosure, and FIGS. 1B and 1C are conceptual views of one example of the electronic device, viewed from different directions.

The electronic device 100 has been illustrated as including elements, such as a wireless communication unit 110, an input unit 120, a sensing unit 140, an output unit 150, an interface unit 160, memory 170, a controller 180, and a power supply unit 190. It should be understood that implementing all of the illustrated elements is not a requirement and that greater or fewer elements may be alternatively implemented. Referring now to FIG. 1A, the electronic device 100 has been illustrated as including wireless communication unit 110 configured with several commonly implemented elements For instance, the wireless communication unit 110 basically includes one or more elements that enable wireless communication between the electronic device 100 and a wireless communication system or network within which the electronic device is located. The wireless communication unit 110 basically includes one or more modules that enable communications, such as wireless communication between the electronic device 100 and a wireless communication system, communication between the electronic device 100 and another electronic device, and communication between the electronic device 100 and an external server. Further, the wireless communication unit 110 basically includes one or more modules that connect the electronic device 100 and one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, that is, one type of audio input device for inputting an audio signal, and a user input unit 123 (e.g., a touch key, a push key, a mechanical key, and a soft key) for allowing a user to input information. Data (e.g., audio, video, and image) is obtained by the input unit 120 and may be analyzed and processed by controller 180 according to device parameters or user commands or combinations thereof.

The sensing unit 140 is basically implemented using one or more sensors for sensing internal information of the electronic device, the surrounding environment of the electronic device, and user information. For example, in FIG.

1A, the sensing unit 140 has been illustrated as including a proximity sensor 141 and an illumination sensor 142. The sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (e.g., the camera 121), a microphone 122, a battery gauge, an environment sensor (e.g., a barometer, a hygrometer, a thermometer, a radiation detection sensor, a thermal sensor, and a gas sensor, among others), and a chemical sensor (e.g., an electronic nose, a health care sensor, and a biometric sensor). The electronic device 100 may be configured to use information obtained by the sensing unit 140, more specifically, information obtained by one or more sensors of the sensing unit 140 and combinations thereof.

The output unit 150 is configured to output various types of information, such as audio, video, and tactile output. The output unit 150 has been illustrated as including a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the electronic device 100 and a user, as well as function as the user input unit 123 which provides an input interface between the electronic device 100 and the user.

The interface unit 160 serves as an interface with various types of external devices that may be coupled to the electronic device 100. The interface unit 160 may include any of wired or wireless ports, external power supply ports, wired or wireless data ports, memory card ports, ports for connecting a device having an identification module, audio input/output (I/O) ports, video I/O ports, and earphone ports. In some cases, the electronic device 100 may perform assorted control functions associated with a connected external device, in response to the external device being connected to the interface unit 160.

The memory 170 is typically implemented to store data to support various functions or features of the electronic device 100. For instance, the memory 170 may be configured to store application programs executed in the electronic device 100, and data or instructions for the operations of the electronic device 100. Some of these application programs may be downloaded from an external server via wireless communication. Other application programs may be installed within the electronic device 100 at time of manufacturing or shipping, which is typically the case for basic functions of the electronic device 100 (e.g., receiving a call, placing a call, receiving a message, and sending a message). In general, application programs are stored in the memory 170, installed in the electronic device 100, and executed by the controller 180 that performs an operation (or function) of the electronic device 100.

The controller 180 functions to control an overall operation of the electronic device 100 in addition to operations associated with application programs.

The controller 180 may provide or process information or functions appropriate for a user by processing signals, data, and information, which are input or output by the various elements depicted in FIG. 1A, or activating application programs stored in the memory 170. For example, the controller 180 controls some or all of the elements illustrated in FIGS. 1A-1C according to the execution of an application program that has been stored in the memory 170.

The power supply unit 190 may be configured to receive external power or provide internal power in order to supply power for driving elements and elements included in the electronic device 100. The power supply unit 190 may include a battery. The battery may be configured to be embedded in the terminal body or to be detachable from the terminal body.

At least some of the elements may operate in conjunction with each other in order to implement the operations, control or control methods of the electronic device to be described below according to various embodiments. Furthermore, the operations, control or control methods of the electronic device may be implemented on the electronic device by the driving of at least one application program stored in the memory 170.

Referring still to FIG. 1A, various elements depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be used to facilitate simultaneously receiving of two or more broadcast channels, or to support switching among broadcast channels.

The mobile communication module 112 may transmit and/or receive wireless signals to and from one or more network entities. Typical examples of a network entity include a base station, an external electronic device, and a server. Such network entities form part of a mobile communication network configured according to technical standards or communication methods for mobile communications (e.g., Global System for Mobile Communication (GSM), Code Division Multi Access (CDMA), Code Division Multi Access 2000 (CDMA 2000), Enhanced Voice-Data Optimized or Enhanced Voice-Data Only (EV-DO), Wideband CDMA (WCDMA), High Speed Downlink Packet access (HSDPA), High Speed Uplink Packet Access (HSUPA), Long Term Evolution (LTE), and Long Term Evolution-Advanced (LTE-A)).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the electronic device 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless Internet module 113 may transmit/receive data according to one or more of such wireless Internet technologies and other Internet technologies as well.

In some embodiments, when wireless Internet access is implemented according to WiBro, HSDPA, HSUPA, GSM, CDMA, WCDMA, LTE, LTE-A, etc. as part of a mobile communication network, the wireless Internet module 113 performs such wireless Internet access. As described above, the Internet module 113 may cooperate with or function as the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and a Wireless Universal Serial Bus (Wireless USB). The short-range communication module 114 supports wireless communication between the electronic device 100 and a wireless communication system, communication between the electronic device 100 and another electronic device 100 or communication between the electronic device and a network where another electronic device 100 (or an external server) is located over a wireless area network. An example of the wireless area network is a wireless personal area network.

In some embodiments, another electronic device (which may be configured similarly to the electronic device 100) may be a wearable device, such as a smart watch, smart glass or a head mounted display (HMD) capable of exchanging data with the electronic device 100 (or capable of cooperating with the electronic device 100). The short-range communication module 114 may sense or recognize the wearable device, and permit communication between the wearable device and the electronic device 100. In addition, when the sensed wearable device is a device authenticated to communicate with the electronic device 100, the controller 180 may cause the transmission of data processed by the electronic device 100 to the wearable device via the short-range communication module 114. In this case, the user of the wearable device may use the data processed by the electronic device 100 on the wearable device. For example, when a call is received in the electronic device 100, the user may answer the call using the wearable device. Also, when a message is received in the electronic device 100, the user may check the received message using the wearable device.

The location information module 115 is generally configured to detect, calculate, derive or otherwise identify a position of the electronic device. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the electronic device. As one example, when the electronic device uses a GPS module, a position of the electronic device may be acquired using a signal sent from a GPS satellite. As another example, when the electronic device uses the Wi-Fi module, a position of the electronic device may be acquired based on information related to a wireless access point (AP) which transmits or receives a wireless signal to or from the Wi-Fi module.

The input unit 120 may be configured to permit various types of input to the electronic device 120. Examples of such input include audio, image, video, data, and user input. Image and video input is often obtained using one or more cameras 121. Such cameras 121 may process image frames of still pictures or video obtained by image sensors in a video or image capture mode. The processed image frames may be displayed on the display unit 151 or stored in memory 170. In some cases, the cameras 121 may be arranged in a matrix configuration to permit a plurality of images having various angles or focal points to be input to the electronic device 100. For another example, the cameras 121 may be located in a stereoscopic arrangement to acquire left and right images for implementing a stereoscopic image.

The microphone 122 is generally implemented to permit audio input to the electronic device 100. The audio input may be processed in various manners according to a function being executed in the electronic device 100. If desired, the microphone 122 may include assorted noise removing algorithms to remove unwanted noise generated in the course of receiving the external audio.

The user input unit 123 is an element that permits input by a user. Such user input may enable the controller 180 to control operation of the electronic device 100. The user input unit 123 may include one or more of a mechanical input element (e.g., a key, a button located on a front and/or rear surface or a side surface of the electronic device 100, a dome switch, a jog wheel, and a jog switch), or a touch-sensitive input, among others. For example, the touch-sensitive input may be a virtual key or a soft key, which is displayed on a touch screen through software processing, or a touch key which is located on the electronic device at a location that is other than the touch screen. The virtual key or the visual key may be displayed on the touch screen in various shapes, for example, graphic, text, icon, video, or a combination thereof.

The sensing unit 140 is configured to sense one or more of internal information of the electronic device, surrounding environment information of the electronic device or user information. The controller 180 cooperates with the sending unit 140 to control operation of the electronic device 100 or execute data processing, a function or an operation associated with an application program installed in the electronic device based on the sensing provided by the sensing unit 140. The sensing unit 140 may be implemented using any of a variety of sensors, some of which will now be described in more detail.

The proximity sensor 141 may include a sensor that senses the presence or absence of an object approaching a surface or an object located near a surface using an electromagnetic field or infrared rays without a mechanical contact. The proximity sensor 141 may be arranged at an inner region of the electronic device covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, and an infrared proximity sensor. When the touch screen is implemented as a capacitance type, the proximity sensor 141 may sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (e.g., distance, direction, speed, time, position, and moving status). In general, controller 180 processes data corresponding to proximity touches and proximity touch patterns sensed by the proximity sensor 141, and cause output of visual information on the touch screen. In addition, the controller 180 may control the electronic device 100 to execute different operations or process different data according to whether a touch with respect to a point on the touch screen is either a proximity touch or a contact touch.

A touch sensor may sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen or a pointer.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be an element separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the electronic device 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, and a hovering touch.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the electronic device 100. For example, the display unit 151 may display execution screen information of an application program executing at the electronic device 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme) or a projection scheme (holographic scheme).

In general, a 3D stereoscopic image may include a left image (e.g., a left eye image) and a right image (e.g., a right eye image). According to how left and right images are combined into a 3D stereoscopic image, a 3D stereoscopic imaging method may be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail may be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit may receive the 3D image and extract the left image and the right image, or may receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, and a broadcast reception mode. The audio output module 152 may provide audible output related to a particular function (e.g., a call signal reception sound, a message reception sound, etc.) performed by the electronic device 100. The audio output module 152 may also be implemented as a receiver, a speaker or a buzzer.

A haptic module 153 may be configured to generate various tactile effects that a user feels, perceive, or otherwise experience. A typical example of a tactile effect generated by the haptic module 153 is vibration. The strength, pattern, etc. of vibration generated by the haptic module 153 may be controlled by user selection or setting by the controller. For example, the haptic module 153 may output different vibrations in a combining manner or a sequential manner.

Besides vibration, the haptic module 153 may generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that may absorb or generate heat.

The haptic module 153 may also be implemented to allow the user to feel a tactile effect through a muscle sensation such as the user's fingers or arm, as well as transferring the tactile effect through direct contact. Two or more haptic modules 153 may be provided according to the particular configuration of the electronic device 100.

An optical output module 154 may output a signal for indicating an event generation using light of a light source. Examples of events generated in the electronic device 100 may include message reception, call signal reception, a missed call, an alarm, a schedule notice, an email reception, information reception through an application.

A signal output by the optical output module 154 may be implemented in such a manner that the electronic device emits monochromatic light or light with a plurality of colors. The signal output may be terminated as the electronic device senses that a user has checked the generated event, for example.

The interface unit 160 serves as an interface for external devices to be connected with the electronic device 100. For example, the interface unit 160 may receive data transmitted from an external device, receive power to transfer to elements and elements within the electronic device 100, or transmit internal data of the electronic device 100 to such external device. The interface unit 160 may include wired or wireless headset ports, external power supply ports, wired or wireless data ports, memory card ports, ports for connecting a device having an identification module, audio input/output (I/O) ports, video I/O ports or earphone ports.

The identification module may be a chip that stores various types of information for authenticating the right to use the electronic device 100 and may include a User Identity Module (UIM), a Subscriber Identity Module (SIM), and a Universal Subscriber Identity Module (USIM). In addition, the device having the identification module (also referred to herein as an "identifying device") may take the form of a smart card. Accordingly, the identifying device may be connected with the electronic device 100 via the interface unit 160.

When the electronic device 100 is connected with an external cradle, the interface unit 160 may serve as a passage to allow power from the cradle to be supplied to the electronic device 100 or may serve as a passage to allow various command signals input by the user from the cradle to be transferred to the electronic device there through. Various command signals or power input from the cradle may operate as signals for recognizing that the electronic device is properly mounted on the cradle.

The memory 170 may store programs to support operations of the controller 180 and store input/output data (e.g., phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. The electronic device 100 may also be operated in relation to a network storage device that performs the storage function of the memory 170 over a network, such as the Internet.

The controller 180 may typically control the general operations of the electronic device 100. For example, the controller 180 may set or release a lock state for restricting a user from inputting a control command with respect to applications when a status of the electronic device meets a preset condition.

The controller 180 may also perform control and processing associated with voice calls, data communications, and video calls or may perform pattern recognition processing for recognizing a handwriting input or a picture drawing input performed on a touch screen as characters or images.

In addition, the controller 180 may control one or a combination of those elements in order to implement various exemplary embodiments disclosed herein.

The power supply unit 190 receives external power or provides internal power and supplies power for driving the elements and elements included in the electronic device 100. The power supply unit 190 may include a battery which is commonly rechargeable or detachably coupled to the electronic device body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 10, the electronic device 100 is described with reference to a bar-type electronic device body. However, the electronic device 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of electronic device (e.g., a bar type, a watch type, and a glasses type).

However, such teachings with regard to a particular type of electronic device will generally apply to other types of electronic devices as well.

The electronic device 100 will generally include a case (e.g., a frame, a housing or a cover) forming the appearance of the electronic device. In this embodiment, the case is formed using a front case 101 and a rear case 102. Various electronic elements are incorporated into a space formed between the front case 101 and the rear case 102. At least one middle case may be additionally positioned between the front case 101 and the rear case 102.

The display unit 151 is shown located on the front side of the electronic device body to output information. As illustrated, a window 151a of the display unit 151 may be mounted to the front case 101 to form the front surface of the electronic device body together with the front case 101.

In some embodiments, electronic elements may also be mounted to the rear case 102. Examples of such electronic elements include a detachable battery 191, an identification module, and a memory card. Rear cover 103 is shown covering the electronic elements, and this cover may be detachably coupled to the rear case 102. Therefore, when the rear cover 103 is detached from the rear case 102, the electronic elements mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, and 103 may be formed using injection-molding synthetic resin or may be made of metal, for example, stainless steel (STS), aluminum (Al) or titanium (Ti).

As an alternative to the example in which the plurality of cases form an inner space for accommodating elements, the electronic device 100 may be configured such that one case forms the inner space. In this example, an electronic device 100 having a uni-body is formed in such a manner that synthetic resin or metal extends from a side surface to a rear surface.

If desired, the electronic device 100 may include a waterproofing unit (not shown) for preventing introduction of water into the electronic device body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The electronic device 100 may include a display unit 151, first and second audio output modules 152a and 152b, a proximity sensor 141, an illumination sensor 142, an optical output module 154, first and second cameras 121a and 121b, first and second manipulation units 123a and 123b, a microphone 122, and an interface unit 160.

FIGS. 1B and 10 depict certain elements as arranged on the electronic device. However, it is to be understood that alternative arrangements are possible and within the teachings of the instant disclosure.

Some elements may be omitted or rearranged. For example, the first manipulation unit 123a may be located on another surface of the electronic device body, and the second audio output module 152b may be located on the side surface of the electronic device body.

The display unit 151 outputs information processed in the electronic device 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which may implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which may be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker that outputs voice audio, alarm sounds, and multimedia audio reproduction.

The window 151a of the display unit 151 will typically include an aperture to permit audio generated by the first audio output module 152a to pass. One alternative is to allow audio to be released along an assembly gap between the structural bodies (e.g., a gap between the window 151a and the front case 101). In this case, a hole independently formed to output audio sounds may not be seen or is otherwise hidden in terms of appearance, thereby further simplifying the appearance and manufacturing of the electronic device 100.

The optical output module 154 may be configured to output light for indicating an event generation. Examples of such events include message reception, call signal reception, a missed call, an alarm, a schedule notice, email reception, and information reception through an application. When a user checks a generated event, the controller may control the optical output unit 154 in order to stop light output.

The first camera 121a may process image frames such as still or moving images obtained by the image sensor in a capture mode or a video call mode. The processed image frames may then be displayed on the display unit 151 or stored in the memory 170.

The first and second manipulation units 123a and 123b are examples of the user input unit 123, which may be manipulated by a user to provide input to the electronic device 100. The first and second manipulation units 123a and 123b may also be commonly referred to as a manipulating portion, and may employ any tactile method that allows the user to perform manipulation such as touch, push or scroll. The first and second manipulation units 123a and 123b may also employ any non-tactile method that allows the user to perform manipulation such as proximity touch or hovering.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, a home key, cancel or search, and the second manipulation unit 123b may be used by the user to provide an input to control a volume level being output from the first or second audio output modules 152a or 152b or to switch to a touch recognition mode of the display unit 151.

As another example of the user input unit 123, a rear input unit (not shown) may be located on the rear surface of the electronic device body. The rear input unit may be manipulated by a user to provide input to the electronic device 100. The input may be used in a variety of different ways. For example, the rear input unit may be used by the user to provide an input for power on/off, start, end, scroll, control volume level being output from the first or second audio output modules 152a or 152b, and switch to a touch recognition mode of the display unit 151. The rear input unit may be configured to permit touch input, a push input, or combinations thereof.

The rear input unit may be located to overlap the display unit 151 of the front side in a thickness direction of the electronic device body. As one example, the rear input unit may be located on an upper end portion of the rear side of the electronic device body such that a user may easily manipulate it using a forefinger when the user grabs the electronic device body with one hand. Alternatively, the rear input unit may be positioned at most any location of the rear side of the electronic device body.

Embodiments that include the rear input unit may implement some or all of the functionality of the first manipulation unit 123a in the rear input unit. As described above, in situations where the first manipulation unit 123a is omitted from the front side, the display unit 151 may have a larger screen.

As a further alternative, the electronic device 100 may include a finger scan sensor which scans a user's fingerprint. The controller 180 may then use fingerprint information sensed by the finger scan sensor as part of an authentication procedure. The finger scan sensor may also be installed in the display unit 151 or implemented in the user input unit 123.

The microphone 122 is shown located at an end of the electronic device 100, but other locations are possible. If desired, multiple microphones may be implemented, with such an arrangement permitting the receiving of stereo sounds.

The interface unit 160 may serve as a path allowing the electronic device 100 to interface with external devices. For example, the interface unit 160 may include one or more of a connection electronic device for connecting to another device (e.g., an earphone or an external speaker), a port for near field communication (e.g., an Infrared Data Association (IrDA) port, a Bluetooth port, and a wireless LAN port) or a power supply electronic device for supplying power to the electronic device 100. The interface unit 160 may be implemented in the form of a socket for accommodating an external card, such as Subscriber Identification Module (SIM), User Identity Module (UIM), or a memory card for information storage.

The second camera 121b is shown located at the rear side of the electronic device body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b may include a plurality of lenses arranged along at least one line. The plurality of lenses may also be arranged in a matrix configuration. The cameras may be referred to as an "array camera". When the second camera 121b is implemented as an array camera, images may be captured in various manners using the plurality of lenses and images with better qualities.

As shown in FIG. 10, a flash 124 is shown adjacent to the second camera 121b. When an image of a subject is captured with the camera 121b, the flash 124 may illuminate the subject.

As shown in FIG. 1B, the second audio output module 152b may be located on the electronic device body. The second audio output module 152b may implement stereophonic sound functions in conjunction with the first audio output module 152a, and may be also used for implementing a speaker phone mode for call communication.

At least one antenna for wireless communication may be located on the electronic device body. The antenna may be installed in the electronic device body or formed by the case. For example, an antenna which configures a part of the broadcast receiving module 111 may be retractable into the electronic device body. Alternatively, an antenna may be formed using a film attached to an inner surface of the rear cover 103, or a case that includes a conductive material.

A power supply unit 190 for supplying power to the electronic device 100 may include a battery 191, which is mounted in the electronic device body or detachably coupled to an outside of the electronic device body. The battery 191 may receive power via a power source cable connected to the interface unit 160. Also, the battery 191 may be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the electronic device, the rear case 103 may be detachably coupled to the rear case 102.

An accessory for protecting an appearance or assisting or extending the functions of the electronic device 100 may also be provided on the electronic device 100.

As one example of an accessory, a cover or pouch for covering or accommodating at least one surface of the electronic device 100 may be provided. The cover or pouch may cooperate with the display unit 151 to extend the function of the electronic device 100. Another example of the accessory is a touch pen for assisting or extending a touch input to a touch screen.

The location information module 115 is generally configured to detect, calculate, or otherwise identify a position of the electronic device. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the electronic device.

A typical GPS module 115 may measure an accurate time and distance from three or more satellites, and accurately calculate a current location of the electronic device according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module may acquire speed information in real time to calculate a current position. Sometimes, accuracy of a measured position may be compromised when the electronic device is located in a blind spot of satellite signals, such as being located in an indoor space. In order to minimize the effect of such blind spots, an alternative or supplemental location technique, such as Wi-Fi Positioning System (WPS), may be used.

The Wi-Fi positioning system (WPS) refers to a location determination technology based on a wireless local area network (WLAN) using Wi-Fi as a technology for tracking the location of the electronic device 100. This technology typically includes the use of a Wi-Fi module in the electronic device 100 and a wireless access point for communicating with the Wi-Fi module.

The Wi-Fi positioning system may include a Wi-Fi location determination server, an electronic device 100, a wireless access point (AP) connected to the electronic device 100, and a database stored with wireless AP information.

The electronic device connected to the wireless AP may transmit a location information request message to the Wi-Fi location determination server.

The Wi-Fi location determination server extracts the information of the wireless AP connected to the electronic device 100, based on the location information request message (or signal) of the electronic device 100. The information of the wireless AP may be transmitted to the Wi-Fi location determination server through the electronic device 100, or may be transmitted to the Wi-Fi location determination server from the wireless AP.

The information of the wireless AP extracted based on the location information request message of the electronic device 100 may include one or more of Media Access Control (MAC) address, service set identification (SSID), a Received Signal Strength Indicator (RSSI), Reference Signal Received Power (RSRP), Reference Signal Received Quality (RSRQ), channel information, privacy, network type, signal strength, and noise strength.

The Wi-Fi location determination server may receive the information of the wireless AP connected to the electronic device 100 as described above, and may extract wireless AP information corresponding to the wireless AP connected to the electronic device from the pre-established database. The information of any wireless APs stored in the database may be information, such as an MAC address, an SSID, RSSI, channel information, privacy, network type, latitude and longitude coordinates, a building at which a wireless AP is located, a floor number, detailed indoor location information (GPS coordinate available), an AP owner's address, and a phone number. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the electronic device 100 using at least one wireless AP information extracted from the database.

A method for extracting (analyzing) location information of the electronic device 100 may include a Cell-ID method, a fingerprint method, a trigonometry method, and a landmark method.

The Cell-ID method is used to determine a position of a wireless AP having the largest signal strength, among peripheral wireless AP information collected by an electronic device, as a position of the electronic device. The Cell-ID method is an implementation that is minimally complex, does not require additional costs, and location information may be rapidly acquired. However, in the Cell-ID method, the precision of positioning may fall below a desired threshold when the installation density of wireless APs is low.

The fingerprint method is used to collect signal strength information by selecting a reference position from a service area, and to track a position of an electronic device using the signal strength information transmitted from the electronic device based on the collected information. In order to use the fingerprint method, it is common for the characteristics of radio signals to be pre-stored in the form of a database.

The trigonometry method is used to calculate a position of an electronic device based on a distance between coordinates of at least three wireless APs and the electronic device. In order to measure the distance between the electronic device and the wireless APs, signal strength may be converted into distance information, Time of Arrival (ToA), Time Difference of Arrival (TDoA) or Angle of Arrival (AoA) may be taken for transmitted wireless signals.

The landmark method is used to measure a position of an electronic device using a known landmark transmitter.

In addition to these position location methods, various algorithms may be used to extract (analyze) location information of an electronic device.

Such extracted location information may be transmitted to the electronic device 100 through the Wi-Fi location determination server, thereby acquiring location information of the electronic device 100.

The electronic device 100 may acquire location information by being connected to at least one wireless AP. The number of wireless APs required to acquire location information of the electronic device 100 may be variously changed according to a wireless communication environment within which the electronic device 100 is positioned.

As previously described with regard to FIG. 1A, the electronic device may be configured to include short-range communication techniques such as Bluetooth™' Radio Frequency Identification (RFID), Infrared Data Association (IrDA), Ultra Wideband (UWB), ZigBee, Near Field Communication (NFC), and a Wireless Universal Serial Bus (Wireless USB).

A typical NFC module provided at the electronic device supports short-range wireless communication, which is a non-contactable type of communication between electronic devices and generally occurs within about 10 cm. The NFC module may operate in one of a card mode, a reader mode, and a P2P mode. The electronic device 100 may further include a security module for storing card information in order to drive the NFC module in the card mode. The security module may be a physical medium such as a Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the electronic device. Single Wire Protocol (SWP)-based data exchange may be performed between the NFC module and the security module.

In a case where the NFC module operates in a card mode, the electronic device may transmit card information on a general IC card to the outside. More specifically, if an electronic device having card information on a payment card (e. g, a credit card or a bus card) approaches a card reader, a short-range mobile payment may be executed. As another example, if an electronic device which stores card information on an entrance card approaches an entrance card reader, an entrance approval procedure may start. A card, such as a credit card, a traffic card, or an entrance card, may be included in the security module in the form of an applet, and the security module may store card information on the card mounted thereon. Card information for a payment card may include any of a card number, the remaining amount, and usage history. Card information of an entrance card may include any of a user's name, a user's number (e.g., undergraduate number or staff number), and an entrance history.

When the NFC module operates in a reader mode, the electronic device may read data from an external tag. The data received from the external tag by the electronic device may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a Peer-to-Peer (P2P) mode, the electronic device may execute P2P communication with another electronic device. In this case, a Logical Link Control Protocol (LLCP) may be applied to the P2P communication. For the P2P communication, the electronic device and another electronic device may be connected. Such connection may be categorized into a connectionless mode which ends after one packet switches and a connection-oriented mode in which packets consecutively switch. For typical P2P communication, data, such as an electronic type name card, address information, a digital photo and a URL, setup parameters for Bluetooth connection and/or Wi-Fi connection, etc. may be switched. The P2P mode may be effectively used in switching data of a small capacity, because an available distance for NFC communication is relatively short.

Further preferred embodiments will be described in more detail with reference to additional drawings. It is understood by those skilled in the art that the present features may be embodied in several forms without departing from the characteristics thereof.

FIG. 2 is a diagram illustrating an embodiment in which the electronic device related to an embodiment of the present invention is attached to a vehicle. FIG. 3 is a diagram illustrating a connection relation between the electronic device related to an embodiment of the present invention and an advanced driver assistance system (ADAS) of a vehicle when the electronic device is attached to the vehicle.

Referring to FIG. 2, the electronic device 100 related to an embodiment of the present invention may be attached to the inside of a vehicle 200. More specifically, the electronic device 100 may be attached to the side of a driver's seat or the upper part of a driver's seat so that the camera 121 of the electronic device faces the front of the vehicle.

When the electronic device 100 is fixed to the vehicle and receives a specific input, it may obtain the height "h" between the electronic device and the ground and the orientation direction of the camera 121 by driving the sensing unit or the camera. In this case, the specific input may be input for executing a specific application that provides services related to the acquisition of the moving path of the vehicle.

For example, the controller 180 of the electronic device may obtain a tilt between a gravity sensor and the ground using the gravity sensor, and may determine the orientation direction of the camera using the tilt. Furthermore, the controller 180 of the electronic device may calculate the distance between an infrared sensor and the ground using the infrared sensor and a vertical distance between the infrared sensor and the ground using the orientation direction of the camera. In addition to the method, the controller 180 of the electronic device may obtain the distance between the camera and the ground and the orientation direction of the camera using various sensors included in the electronic device.

At least one of the camera, controller, location information module, and display unit of the electronic device 100 attached to the vehicle may be formed in a physically separated space within the vehicle. The elements send and receive data through wired/wireless communications.

Referring to FIG. 3, the electronic device 100 may be connected to the advanced driver assistance system (ADAS) 300 of the vehicle.

The ADAS of the vehicle means a device performing at least of a front collision prevention function, a lane departure warning function, a blind spot monitoring function, and a back monitoring function using advanced sensors and an intelligent imaging device attached to the vehicle. In general, the ADAS is connected to the main control device and assistant control device of the vehicle, and may flicker LEDs, output a warning sound, or generate vibration when a specific event is generated and may send a control signal that directly control the engine, braking system, etc. of the vehicle.

If the electronic device 100 according to an embodiment of the present invention is installed on the vehicle, it is connected to the ADAS 300 and may send the moving path of the vehicle, obtained by the electronic device, to the ADAS.

Although not shown, the electronic device 100 may be integrated with the ADAS 300 installed on the vehicle.

FIG. 4 is a flowchart illustrating an embodiment of a method for controlling the electronic device, which is related to an embodiment of the present invention. FIGS. 5 to 9 are diagrams illustrating an embodiment of a method for controlling the electronic device related to an embodiment of the present invention.

Referring to FIG. 4, the controller 180 of the electronic device may receive the first location information of the vehicle through the location information module (S110), may capture an image through the camera while the vehicle is driven (S120), and may extract characteristic points from the captured image and convert the captured image into a 3-D image (S130).

The controller may receive the Global Positioning System (GPS) information of the vehicle into the first location information through the location information module.

The controller may photograph the image received through the camera in a set time cycle or may photograph the received image as a moving image. The controller may extract the characteristic points of an object included in each frame of the captured image. In this case, the controller may extract the characteristic points of the object using various image processing technologies. For example, the controller may extract the edges of an object included in each frame as characteristic points or may extract the characteristic points by taking into consideration the pixel values of the respective pixels of each frame.

The controller may convert the captured image (i.e., 2-D image) into the 3-D image based on the characteristic points. More specifically, the controller may convert the 2-D image into the 3-D image using the characteristic points and a moving displacement and orientation direction of the camera. In this case, the controller may determine a moving displacement of the vehicle to be a moving displacement of the camera.

The controller 180 may obtain second location information by correcting the first location information based on the moving displacement and orientation direction of the camera installed on the vehicle (S140).

The controller may periodically receive the first location information from the location information module and correct the received first location information by taking into consideration a moving displacement and orientation direction of the camera installed on the vehicle that is being driven. The controller may estimate information about the actual location of the vehicle by applying the location of the characteristic points and the moving displacement of the camera to a Simultaneous Localization And Mapping (SLAM) technology.

The SLAM technology means a technology for writing a map for a surrounding environment while recognizing its own location in a moving robot or equipment. The location may be recognized using the direction of progress and a relative distance for a surrounding environment an initial location. The location may be recognized by calculating a projection matrix to which homogeneous coordinates have been applied by matching the characteristic points of a 2-D image frame with 3-D coordinates. The map may be written by detecting characteristic points in each frame of an image captured by the camera and matching one point in an actual space with points on each image frame. That is, the location recognition and the map writing may be complementarily performed. A detailed method for estimating the location information is described later with reference to FIG. 7.

The controller 180 may extract an aerial view from the 3-D image based on the moving displacement and orientation direction of the camera (S150), and may estimate the moving path of the vehicle using the locations of traffic lanes included in the aerial view and the second location information (S160).

The controller may extract the aerial view, seen from top to bottom, from the 3-D image and display the moving path of the vehicle in the aerial view. In this case, the controller may estimate the moving path of the vehicle by connecting pieces of the second location information by taking into consideration the moving displacement and orientation direction of the camera.

The controller 180 may display the captured image and the moving path of the vehicle in augmented reality by combining the captured image and the moving path of the vehicle (S170).

Augmented reality is the synthesis of a virtual image or information with an actual physical space. Mixed reality, that is, the addition of augmented virtual reality to augmented reality, is the generation of a new environment in which a virtual object and the actual coexist.

The controller may check a relative location of a user (or the camera) by recognizing a surrounding environment through the camera and may display virtual content at a proper place in augmented reality or mixed reality.

More specifically, the controller may perform a comparison on continuous frames of an image captured by the camera and extract a specific object and information about the location of the specific object. If the specific object is covered with another object by taking into consideration the location information of the specific object, the controller may display a virtual specific object in augmented reality.

The electronic device 100 may further include a head-up display (HUD) unit formed in the front or side glass of the vehicle. The controller may display augmented reality, including a virtual specific object, on the HUD unit.

The electronic device 100 further includes the wireless communication unit. When surrounding images are received through the wireless communication unit, the controller may obtain the second location information by comparing a captured image with the surrounding images. In this case, the controller may receive surrounding images corresponding to the first location information. The controller may obtain preliminary second location information by primarily correcting the first location information based on a moving displacement and orientation direction of the camera, and may obtain the second location information by comparing the captured image with the surrounding images received through the wireless communication unit and secondarily correcting the preliminary second location information.

Furthermore, if, as a result of the comparison, the captured image is not identical with the surrounding images, the controller may request the update of surrounding images corresponding to specific location information by sending the captured image through the wireless communication unit.

The controller may periodically perform the processes of the extraction of characteristic points, a conversion into a 3-D image, the extraction of an aerial view, the correction of location information, the extraction of the moving path of the vehicle, and the display of augmented reality on a captured image or each frame of a moving image.

An embodiment of the present invention is described in detail below with reference to FIGS. 5 to 9.

FIG. 5 is a diagram illustrating a method for converting a two-dimensional (2-D) image, obtained by the electronic device, into a 3-D image, which is related to an embodiment of the present invention.

Referring to FIG. 5, the controller may obtain a 2-D image captured by the camera installed on the vehicle. The controller may capture a 2-D image in a set cycle or may capture a moving image and obtain each frame of the moving image as a 2-D image.

The controller may extract characteristic points from each frame of the 2-D image. A method for extracting the characteristic points may be processed by various image processing methods. For example, the controller may extract the edges of an object included in the frame as the characteristic points.

The controller may convert the 2-D image into a 3-D image by taking into consideration the extracted characteristic points and a moving displacement and orientation direction of the camera. More specifically, the controller may obtain the moving displacement of the camera using a moving speed and moving direction sensed by the sensing unit of the electronic device fixed to the vehicle while the vehicle is driven. Furthermore, the controller may obtain the moving displacement and orientation direction of the camera based on the shaking, rotation, etc. of the electronic device while the vehicle is driven using a sensing signal sensed by the sensing unit embedded in the electronic device. The controller may calculate relative perspective of the characteristic points extracted based on the moving displacement and orientation direction of the camera obtained by the sensing unit, and may convert the 2-D image into the 3-D image.

FIG. 6 is a diagram illustrating a method for obtaining an aerial view in the electronic device, which is related to an embodiment of the present invention.

Referring to FIG. 6, the controller may turn the 3-D image in a direction seen from top to bottom and obtain an image of a road including lanes in the form of an aerial view. Furthermore, the controller may display the moving path "a" of the vehicle by displaying information about the location of the vehicle in the aerial view.

FIGS. 7 and 8 are diagrams illustrating a method for estimating the moving path of the vehicle using an SLAM technology in the electronic device, which is related to an embodiment of the present invention.

Referring to FIG. 7, the controller may estimate information about the actual location of the vehicle by applying the location of the characteristic points and the moving displacement of the camera to the SLAM technology.

The controller may estimate the state vector of the camera of a (k+1)-th frame and the location information of a landmark m using the state vector x of the camera of a k-th frame, the moving displacement u of the camera, and the monitoring vector z of the landmark m on a frame. That is, the controller may estimate the state vector $x_{k+1}$ of the camera of the (k+1)-th frame and information about the location of a landmark $m_k$ using the state vector $x_k$ of the camera of the k-th frame, the moving displacement $u_k$ of the camera, the landmark $m_j$ on the frame, and a monitoring vector $z_k$. The controller may estimate information about the actual location of the vehicle by repeating such a method.

Referring to FIG. 8, the controller may periodically receive first location information "g1", "g2", "g3", and "g4", and may estimate second location information "a" by correcting each of the pieces of first location information using the above correction method.

The controller may estimate the second location information by applying the SLAM technology to the second location information whenever the first location information is received or may divide a cycle interval in which the first location information is received into a plurality of intervals and estimate the second location information. That is, the controller may divide an interval between an interval in which the location information "g1" is received and an interval in which the location information "g2" is received two or more times, and may estimate the second location information.

The controller may display an image including lanes and buildings "b1", "b2", and "b3" near the lanes, which are seen from top, in an aerial view, and may display the moving path "a" of the vehicle in the lanes "l" and "l1."

FIG. 9 is a diagram illustrating a method for displaying the moving path of the vehicle in augmented reality in the electronic device, which is related to an embodiment of the present invention.

Referring to FIG. 9, the controller may combine the obtained 3-D image and the moving path of the vehicle and display the results of the combination in augmented reality.

The controller may check a relative location of a user (or the camera) by recognizing a surrounding environment through the camera and may display virtual content at an appropriate place in augmented reality or mixed reality.

More specifically, the controller may extract a specific object "ob" and information about the location of the specific object by performing a comparison on continuous frames of an image captured by the camera, and may display a virtual specific object "ob" in augmented reality if the specific object "ob" is covered with another object "c1" by taking into consideration the location information of the specific object.

The electronic device may further include a head-up display (HUD) unit disposed on the front or side glass of the vehicle. The controller may display augmented reality, including the virtual specific object, on the HUD unit.

In accordance with an embodiment of the present invention, information about a more accurate location of a vehicle can be obtained because the moving path of the vehicle is estimated by applying the SLAM technology to the moving path by taking into consideration a moving displacement of the vehicle and the orientation direction of the camera in addition to GPS information. Furthermore, information that is necessary in relation to the driving of the vehicle can be generated in the form of virtual content and provided.

Various embodiments may be implemented using a machine-readable medium having instructions stored thereon for execution by a processor to perform various methods presented herein. Examples of possible machine-readable mediums include a Hard Disk Drive (HDD), a Solid State Disk (SSD), a Silicon Disk Drive (SDD), ROM, RAM, CD-ROM, a magnetic tape, a floppy disk, an optical data storage device, the other types of storage mediums presented herein, and combinations thereof. If desired, the machine-readable medium may be realized in the form of a carrier wave (e.g., a transmission through the Internet). The processor may include the controller 180 of the electronic device. The foregoing embodiments are merely exemplary and are not to be considered as limiting the present disclosure. The present teachings may be readily applied to other types of methods and devices. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the scope of the claims, or equivalents of such a scope, are therefore intended to be embraced by the appended claims.

The invention claimed is:

1. An electronic device for use in a vehicle, the electronic device comprising:
   a communication unit;
   a location information module;
   a camera;
   a head-up display (HUD) unit for coupling to a front or side window of the vehicle;
   an advanced driver assistance system (ADAS); and
   a controller configured to:

extract characteristic points of an image captured by the camera, convert the captured image into a 3-D image, obtain second location information by correcting first location information received through the location information module based on a moving displacement and orientation direction of the camera, extract an aerial view from the 3-D image using the moving displacement and orientation direction of the camera, estimate a moving path of a vehicle using locations of traffic lanes included in the aerial view and the obtained second location information, cause the communication unit to send the moving path of the vehicle to the advanced driver assistance system (ADAS), and display, via the head-up display, the captured image and the moving path of the vehicle in augmented reality by combining the captured image and the moving path of the vehicle.

2. The electronic device of claim 1, wherein the controller estimates the moving path of the vehicle by applying locations of the characteristic points and a moving displacement of the camera to a Simultaneous Localization And Mapping (SLAM) technology.

3. The electronic device of claim 1, wherein the controller extracts a specific object and information about a location of the specific object by performing a comparison on continuous frames of the image captured by the camera, generates a virtual specific object if the specific object is covered with another object by taking into consideration the location information of the specific object, and displays the virtual specific object in the augmented reality.

4. The electronic device of claim 1, wherein the controller extracts edges of an object included in the captured image as the characteristic points.

5. The electronic device of claim 1, wherein the controller converts the captured image into the 3-D image using the moving displacement and orientation direction of the camera.

6. The electronic device of claim 1, wherein the controller extracts the aerial view from the 3-D image using a distance between a horizontal line of the camera and the ground and the orientation direction of the camera.

7. The electronic device of claim 1, wherein the camera and the location information module are attached to the vehicle.

8. The electronic device of claim 1, further comprising a wireless communication unit, wherein the controller obtains the second location information by comparing the captured image with surrounding images when the surrounding images are received through the wireless communication unit.

9. The electronic device of claim 8, wherein if the captured image is not identical with the surrounding images, the controller requests surrounding images corresponding to specific location information to be updated by sending the captured image through the wireless communication unit.

10. The electronic device of claim 1, wherein the controller corrects location information for each frame of an image captured by the camera, extracts characteristic points of each frame, converts the captured image into a 3-D image, extracts an aerial view from the 3-D image, estimates a moving path of the vehicle, and displays the captured image and the moving path of the vehicle in augmented reality by combining the captured image and the moving path of the vehicle.

11. A method for controlling an electronic device, the method comprising:

receiving first location information of a vehicle through a location information module;

capturing an image through a camera while the vehicle is driven;

extracting characteristic points from the captured image and converting the captured image into a 3-D image;

obtaining second location information by correcting the first location information based on a moving displacement and orientation direction of the camera installed on the vehicle;

extracting an aerial view from the 3-D image based on the moving displacement and orientation direction of the camera;

estimating a moving path of the vehicle using locations of traffic lanes included in the aerial view and the second location information; and displaying the captured image and the moving path of the vehicle in augmented reality by combining the captured image and the moving path.

* * * * *